US011454280B2

(12) United States Patent
Thompson et al.

(10) Patent No.: US 11,454,280 B2
(45) Date of Patent: Sep. 27, 2022

(54) ROTOR RETENTION FITTING WITH INTEGRAL BEARING AND PITCH CONTROL

(71) Applicant: Textron Innovations Inc., Providence, RI (US)

(72) Inventors: George Matthew Thompson, Lewisville, TX (US); Joseph Richard Carpenter, Jr., Burleson, TX (US); Paul Sherrill, Grapevine, TX (US); Jonathan Andrew Knoll, Alvarado, TX (US)

(73) Assignee: Textron Innovations Inc., Providence, RI (US)

( * ) Notice: Subject to any disclaimer, the term of this patent is extended or adjusted under 35 U.S.C. 154(b) by 178 days.

(21) Appl. No.: 16/916,353

(22) Filed: Jun. 30, 2020

(65) Prior Publication Data

US 2021/0404516 A1 Dec. 30, 2021

(51) Int. Cl.
*B64C 27/48* (2006.01)
*F16C 33/06* (2006.01)
*B64C 27/32* (2006.01)
*B64C 27/54* (2006.01)
*F01D 25/16* (2006.01)
*F16C 17/02* (2006.01)

(52) U.S. Cl.
CPC .............. *F16C 33/06* (2013.01); *B64C 27/32* (2013.01); *B64C 27/54* (2013.01); *F01D 25/16* (2013.01); *F16C 17/02* (2013.01); *F16C 2380/26* (2013.01)

(58) Field of Classification Search
None
See application file for complete search history.

(56) References Cited

U.S. PATENT DOCUMENTS

| | | | | |
|---|---|---|---|---|
| 3,026,942 A | * | 3/1962 | Cresap ................... | B64C 27/54 416/102 |
| 3,556,673 A | * | 1/1971 | Kilian et al. ............ | B64C 27/35 416/141 |
| 3,637,321 A | * | 1/1972 | Nekrasov ................ | B64C 27/32 416/123 |
| 3,652,185 A | * | 3/1972 | Cresap ................... | B64C 27/35 416/134 A |
| 4,299,538 A | * | 11/1981 | Ferris .................... | B64C 27/33 416/134 A |

(Continued)

FOREIGN PATENT DOCUMENTS

GB 2442147 A 3/2008

*Primary Examiner* — Kayla Mccaffrey
(74) *Attorney, Agent, or Firm* — Shackelford, Bowen, McKinley & Norton, LLP

(57) ABSTRACT

A bearing system includes an inboard bearing assembly and an outboard bearing assembly. The inboard bearing assembly includes an inboard fitting and an inboard race. The inboard fitting includes a plate with a convex mating surface and a first aperture formed through the plate for receiving a blade root of a rotor blade. The inboard race comprising a concave mating surface configured to receive the convex mating surface a second aperture formed the inboard race. The outboard bearing assembly includes an outboard bearing assembly comprising an outboard fitting having an aperture formed therethrough for receiving the blade root of the rotor blade.

20 Claims, 4 Drawing Sheets

(56) References Cited

U.S. PATENT DOCUMENTS

| | | | | |
|---|---|---|---|---|
| 5,118,256 A | * | 6/1992 | Violette | F16C 27/066 |
| | | | | 416/239 |
| 6,113,352 A | * | 9/2000 | Certain | B64C 27/33 |
| | | | | 416/207 |
| 6,287,076 B1 | * | 9/2001 | Mouille | B64C 27/45 |
| | | | | 416/134 A |
| 9,623,966 B1 | * | 4/2017 | van der Westhuizen | ................... |
| | | | | B64C 27/48 |
| 2015/0330233 A1 | | 11/2015 | Petellaz et al. | |
| 2017/0343008 A1 | | 11/2017 | Patsouris et al. | |

* cited by examiner

ROTOR RETENTION FITTING WITH INTEGRAL BEARING AND PITCH CONTROL

TECHNICAL FIELD

The present disclosure relates generally to a rotor system and more particularly, but not by way of limitation, to a retention fitting integral bearing and pitch control.

BACKGROUND

This section provides background information to facilitate a better understanding of the various aspects of the disclosure. It should be understood that the statements in this section of this document are to be read in this light, and not as admissions of prior art.

Rotor systems are used in a variety of aircraft to provide thrust to propel the aircraft through the air. Most rotor systems allow for some adjustability of rotor speed and/or rotor pitch to manipulate the amount of thrust generated by the rotors. For example, helicopters often employ one main rotor system to provide thrust. During normal operation, helicopters maintain a constant rotor speed and adjust the amount (i.e., collective control) and direction (i.e., cyclic control) of thrust generated by the rotor system by changing the pitch of the rotors. The amount of thrust produced by the main rotor system is varied by changing the pitch of the rotors using collective pitch control (i.e., the pitch of the rotors is altered in unison). The direction of travel of the helicopter is controlled using cyclic pitch control (i.e., the pitch of the rotors is altered sequentially to create a thrust vector). Helicopters also often employ a tail fan system to counter torque effects from the main rotor system and to provide direction control. In contrast to main rotors, tail fans only use collective pitch control and do not include cyclic control.

While helicopters typically rely upon collective pitch control to vary the thrust of the main rotor system and tail fan system, some aircraft instead alter the speed of the rotor system to control the amount of thrust generated by the rotor system. Speed-based control of thrust generation of the main rotor system is not typically appropriate for use in helicopters for several reasons. For example, speed-based control is slower to react compared to pitch-based control as the rotational inertia of the rotor system makes it difficult to quickly change the speed of the rotor system. However, speed-based control of thrust generation could be used for the tail fan system of a helicopter and may also be desirable in other aircraft applications, such as, for example, airplanes and multi-rotor aircraft.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

An example of an inboard bearing assembly includes a fitting and a race. The fitting includes a plate with a convex mating surface and a first aperture formed through the plate for receiving a blade root of a rotor blade. The flange extends from the plate and includes a pitch arm. The race includes a second aperture formed through the race and a concave mating surface that receives the convex mating surface of the plate.

An example of a bearing system includes an inboard bearing assembly and an outboard bearing assembly. The inboard bearing assembly includes an inboard fitting and an inboard race. The inboard fitting includes a plate with a convex mating surface and a first aperture formed through the plate for receiving a blade root of a rotor blade. The inboard race comprising a concave mating surface configured to receive the convex mating surface a second aperture formed the inboard race. The outboard bearing assembly includes an outboard bearing assembly comprising an outboard fitting having an aperture formed therethrough for receiving the blade root of the rotor blade.

A rotor system includes a rotor hub comprising an arm extending radially outward, a yoke disposed within the rotor hub, a rotor blade having a blade root that extends through the arm of the rotor hub, and an inboard bearing assembly that couples the rotor blade to the yoke. The inboard bearing assembly includes an inboard fitting having a plate with a convex mating surface and a first aperture formed through the plate for receiving the blade root, and a pitch arm coupled to the plate and comprising a second aperture having a central axis that is offset from a central axis of the first aperture.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
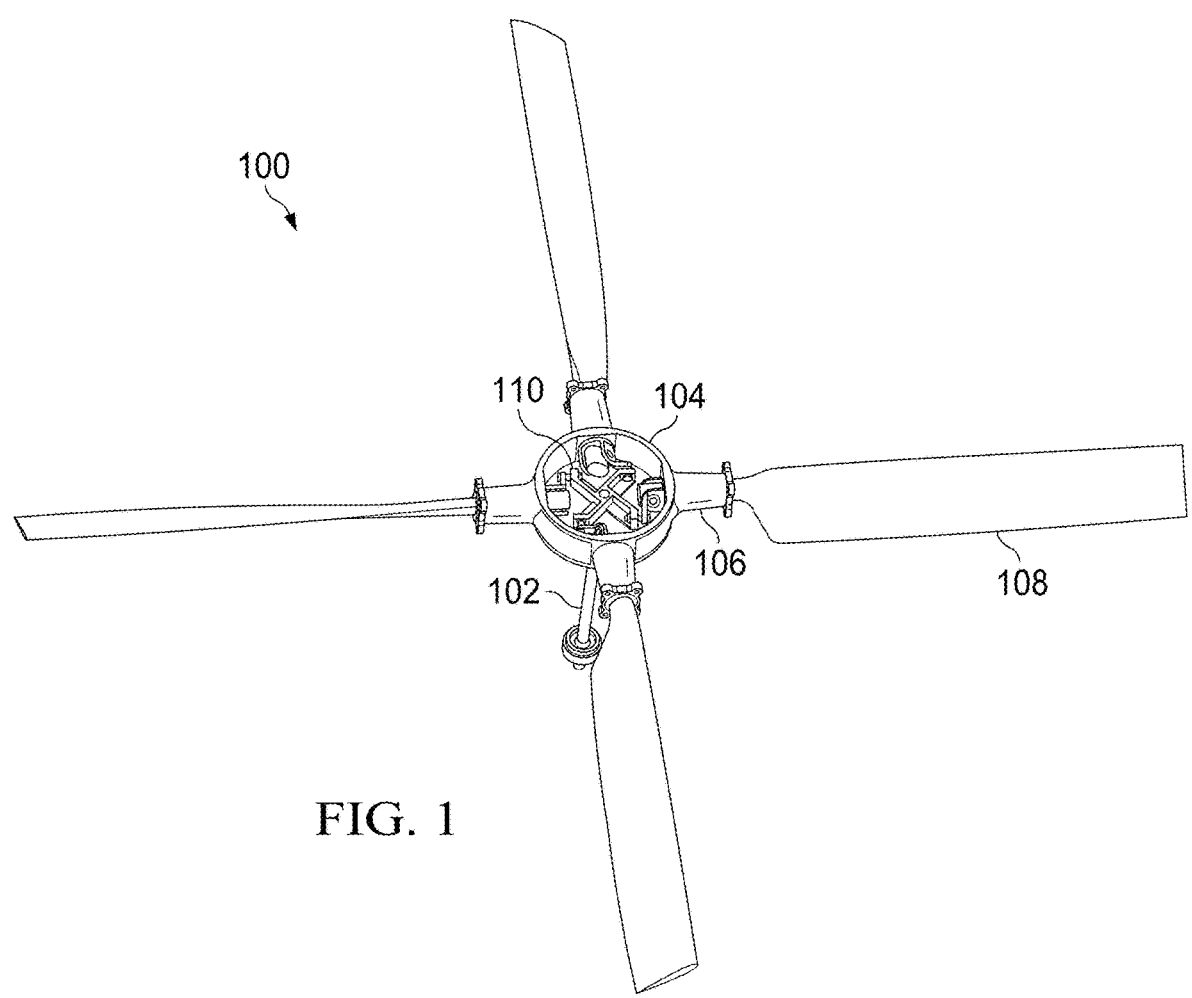
FIG. 1 illustrates a rotor system, according to aspects of the disclosure.

It is to be understood that the following disclosure provides many different aspects, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 illustrates a rotor system 100, according to aspects of the disclosure. Rotor system 100 may be incorporated into a variety of aircraft and watercraft. For example, rotor system 100 may be used as a tail fan system in a helicopter. Other applications for rotor system 100 include airplanes, multi-rotor aircraft, boats (e.g., propeller systems), and other rotor/propeller systems that use speed to vary the amount of thrust generated by the rotor/propeller systems. One particular application of rotor system 100 is for use with multi-rotor aircraft that utilize electric motors to power rotor system 100. Examples of multi-rotor aircraft include drones and passenger aircraft that include two or more rotors powered by electric motor(s). Compared to gas turbines, electric motors are able to more quickly vary the amount of torque provided to the rotor system, and thus can more quickly alter the speed of the rotor system. The quick responsiveness of the electric motor makes it an ideal power source for speed-based control of thrust generated by rotor system 100.

Rotor system 100 is connected to a control tube 102 and a mast. The mast is hidden from view to more clearly illustrate control tube 102 that is concentrically disposed within the mast. The mast is coupled to yoke 104 and supplies torque to rotor system 100 from a power source. The power source may be, for example, an electric motor, gas turbine, or the like. Yoke 104 includes a plurality of arms 106, each of which receives a rotor blade 108. Pitch of rotor blades 108 may be collectively changed by moving a crosshead 110 that is coupled to control tube 102. To alter the pitch of rotor blades 108, control tube 102 is moved axially within the mast to displace crosshead 110 axially. Each rotor blade 108 is coupled to an arm 111 of crosshead 110 (see FIG. 3) so that axial displacement of crosshead 110 pitches rotor blades 108. Pitch control of rotor blades 108 is discussed in more detail below.

Figure 2:
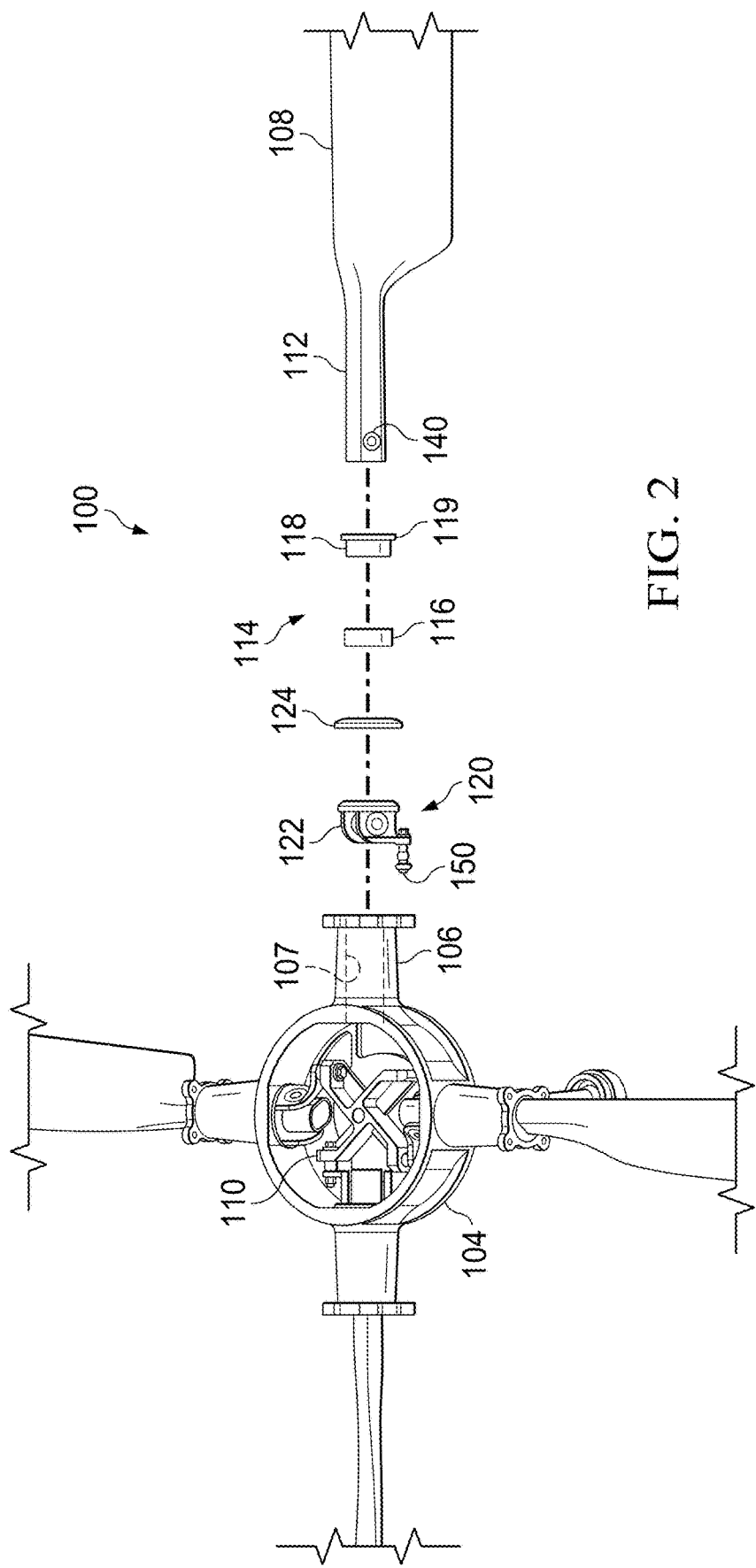
FIG. 2 is an exploded assembly of the rotor system of FIG. 1, according to aspects of the disclosure.

FIG. 2 is an exploded assembly of rotor system 100, according to aspects of the disclosure. Each rotor blade 108 is secured to yoke 104 via an outboard bearing assembly 114 and an inboard bearing assembly 120. For simplicity, only one rotor blade 108 is discussed with the understanding that the discussion thereof applies to each rotor blade 108 of rotor system 100. Outboard bearing assembly 114 includes a race 116 and a fitting 118. Race 116 is secured within a bore 107 of arm 106 and fitting 118 is secured to a blade root 112 of rotor blade 108. Outboard bearing assembly 114 allows rotor blade 108 to axially rotate within arm 106 so that a pitch of rotor blade 108 may be varied.

Race 116 acts as a bearing race for fitting 118 and may be secured within bore 107 in a variety of ways. In some aspects, race 116 is secured within bore 107 via one or more retaining rings that fit into grooves formed into the wall of bore 107. For example, retaining rings may be placed on either side of race 116 to hold race 116 in place within bore 107. In some aspects, arm 106 may include a shoulder against which one side of race 116 may abut. A retaining ring may be used on the other side of race 116 to secure race 116 between the shoulder and the retaining ring. In other aspects, race 116 may be fixed to bore 107 via an adhesive. Race 116 may be made from nylon, Teflon, steel, aluminum, copper alloys such as brass and bronze, sintered metals impregnated with lubricant such as graphite, composite materials such as glass or carbon reinforced plastics, or a combination of these materials depending on the loading and desired wear characteristics. In some aspects, race 116 may include a coating to improve hardness and/or reduce friction.

Fitting 118 may be secured to blade root 112 in a variety of ways. In some aspects, fitting 118 is secured to blade root 112 via an adhesive. In other aspects, fitting 118 may be integrally formed as a part of blade root 112. Fitting 118 may be made from aluminum, glass-reinforced plastic, carbon-reinforced plastic, and the like. In some aspects, fitting 118 may include a coating to improve hardness and/or reduce friction. In some aspects, fitting 118 includes a lip 119 that has a diameter that is larger than a diameter of bore 107 to act as a stop to prevent rotor blade 108 from sliding farther into bore 107. In other aspects, fitting 118 does not include lip 119 and is instead restrained from moving further into bore 107 by a retaining ring that is seated in a groove formed into fitting 118. In some aspects, the retaining ring is also used to help secure race 116 within bore 107.

Figure 3:
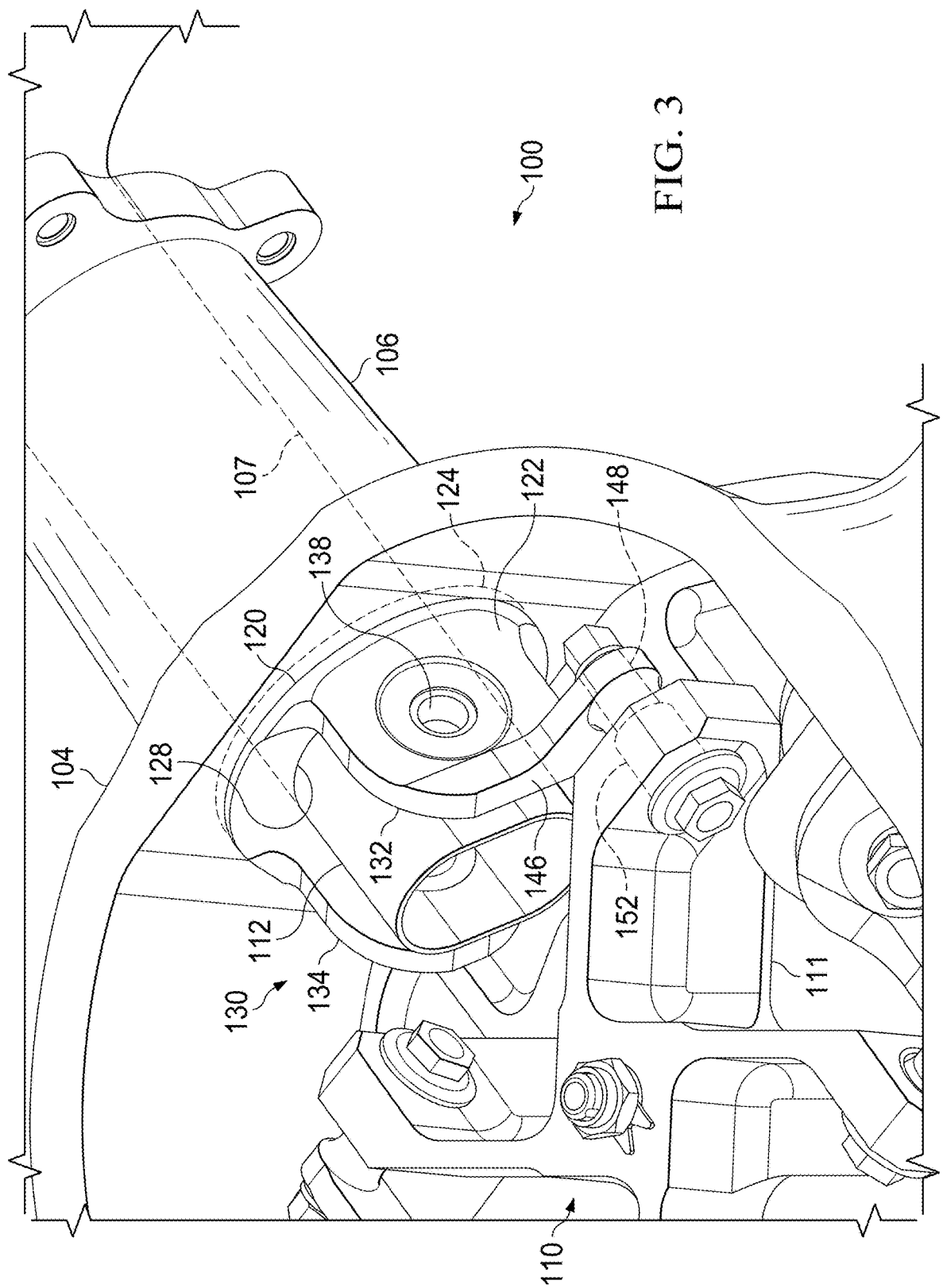
FIG. 3 is a partial perspective view of a rotor hub, according to aspects of the disclosure.
Figure 4:
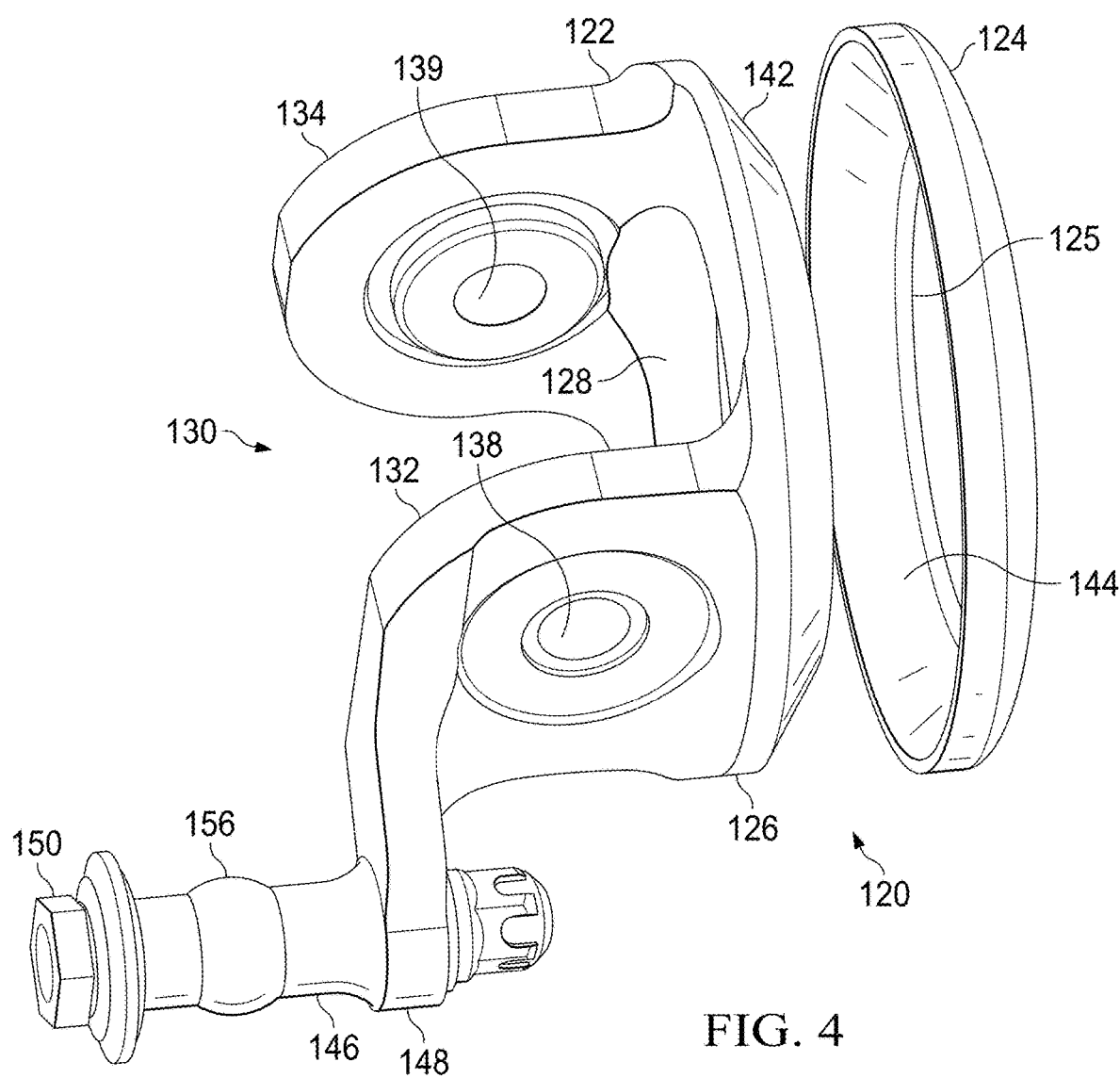
FIG. 4 is a perspective view of a bearing assembly, according to aspects of the disclosure.

Inboard bearing assembly 120 includes a fitting 122 and a race 124. FIGS. 3 and 4 show more detailed views of inboard bearing assembly 120. FIG. 3 is a perspective view of inboard bearing assembly 120 seated in yoke 104 and FIG. 4 is an exploded assembly of fitting 122 and race 124. Fitting 122 includes a plate 126 with an aperture 128 through which an end of blade root 112 passes. Race 124 similarly includes an aperture 125 that is coaxial with aperture 128. The end of blade root 112 is secured to inboard bearing assembly 120 via a flange 130 that is attached to plate 126. Flange 130 includes two ears 132, 134 arranged on opposite sides of aperture 128. In some aspects, flange 130 may have a single ear. Blade root 112 is secured to flange 130 via a fastener (e.g., a bolt or pin) that passes through apertures 138, 139 of flange 130 and an aperture 140 (best seen in FIG. 2) formed through the end of blade root 112.

Plate 126 includes a face 142 that mates with a face 144 of race 124. In some aspects, face 142 is spherical and convex and face 144 is complementarily spherical and concave to receive face 142. Using spherical surfaces for faces 142, 144 permits inboard bearing assembly 120 to both rotate about a central axis running through blade root 112 (i.e., to pitch) and to pivot off axis to allow some in-plane and out-of-plane movement of rotor blade 108. In other aspects, faces 142, 144 may have conical surfaces. Conical surfaces still permit blade root 112 to rotate about the central axis of blade root 112, but do not permit blade root 112 to pivot off axis.

Inboard bearing assembly 120 resists centrifugal force that acts upon rotor blade 108 while rotor system 100 rotates. The centrifugal force acting upon rotor blade 108 is a radial force that tends to pull rotor blade 108 out of bore 107. However, when rotor system 100 is stationary, inboard bearing assembly 120 does not restrain rotor blade 108 from sliding toward crosshead 110. Lip 119 of outboard bearing assembly 114, which is secured to blade root 112, acts as a stop to prevent rotor blade 108 from sliding into crosshead 110.

Flange 130 includes a pitch arm 146 that extends from ear 132. Pitch arm 146 includes an aperture 148 that receives a fastener 150 to couple pitch arm 146 to crosshead 110. Fastener 150 may be a bolt, pin, link, or the like. Crosshead 110 includes a plurality of arms 111, with one arm 111 for each rotor blade 108. Each arm 111 includes an aperture 152 through which fastener 150 passes to connect crosshead 110 to pitch arm 146. Aperture 152 includes a race that provides a bearing surface for a spherical bearing 156 (see FIG. 4) that is positioned on fastener 150. In some aspects, the race may be removed and the wall of aperture 152 may be used as the bearing surface. Spherical bearing 156 allows for some axial misalignment between fastener 150 and blade root 112. A central axis of aperture 152 is offset from the central axis of blade root 112 and apertures 125, 128 so that axially displacing crosshead 110 (e.g., axial displacement coaxial to control tube 102) causes rotor blade 108 to pitch.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed aspect, the terms "substantially," "approximately," "generally," and "about" may be substituted with "within [a percentage] of" what is specified, where the percentage includes 0.1, 1, 5, and 10 percent.

The foregoing outlines features of several aspects so that those skilled in the art may better understand the aspects of the disclosure. Those skilled in the art should appreciate that they may readily use the disclosure as a basis for designing or modifying other processes and structures for carrying out the same purposes and/or achieving the same advantages of the aspects introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An inboard bearing assembly comprising:
   a plate with a convex mating surface and a first aperture formed through the plate for receiving a blade root of a rotor blade;
   a flange comprising a pair of ears extending from the plate, each ear of the pair of ears having an aperture, and comprising a pitch arm; and
   a race comprising a second aperture formed through the race and a concave mating surface that receives the convex mating surface of the plate.

2. The inboard bearing assembly of claim 1, wherein the convex and concave mating surfaces are spherical.

3. The inboard bearing assembly of claim 1, wherein the convex and concave mating surfaces are conical.

4. The inboard bearing assembly of claim 1, wherein the pitch arm comprises a third aperture, the third aperture comprising an axis that is offset from an axis of the first aperture.

5. A bearing system for a rotor system, the bearing system comprising:
   an inboard bearing assembly comprising:
     an inboard fitting comprising a plate with a convex mating surface and a first aperture formed through the plate for receiving and passing a blade root of a rotor blade;
     an inboard race comprising a concave mating surface configured to receive the convex mating surface and a second aperture formed through the inboard race for receiving and passing the blade root; and
     a flange extending from the plate, the flange comprising an aperture for securing the inboard fitting to the blade root inboard of the plate and the inboard race; and
   an outboard bearing assembly comprising an outboard fitting having an aperture formed therethrough for receiving the blade root of the rotor blade.

6. The bearing system of claim 5, wherein the inboard fitting comprises a pitch arm; and
   the convex and the concave mating surfaces are spherical.

7. The bearing system of claim 5, wherein the inboard fitting comprises a pitch arm; and
   the convex and the concave mating surfaces are conical.

8. The bearing system of claim 5, wherein the outboard fitting comprises a lip that extends radially outward from the outboard fitting.

9. The bearing system of claim 5, wherein the flange comprises a pair of ears that extend from the plate, each ear of the pair of ears comprising the aperture.

10. The bearing system of claim 6, wherein the flange comprises a pitch arm.

11. The bearing system of claim 10, wherein the pitch arm comprises a third aperture, the third aperture comprising a central axis that is offset from a central axis of the first aperture.

12. The bearing system of claim 5, wherein the convex and concave mating surfaces are spherical.

13. A rotor system comprising:
    a yoke comprising an arm extending radially outward;
    a crosshead disposed within the yoke;
    an inboard bearing assembly that couples a rotor blade to the crosshead and comprising:
      a plate with a convex mating surface and a first aperture formed through the plate;
      a flange extending inboard from the plate;
      an inboard race comprising a concave mating surface receiving the convex mating surface and a second aperture formed through the inboard race; and
      a pitch arm coupled to the plate and the crosshead; and
    the rotor blade comprising a blade root that extends through the arm of the yoke, the first aperture, and the second aperture and the blade root is secured to the flange.

14. The rotor system of claim 13, wherein the rotor system further comprises an outboard bearing assembly comprising an outboard fitting having an aperture formed therethrough for receiving the blade root of the rotor blade.

15. The rotor system of claim 14, wherein the outboard fitting comprises a lip that extends radially outward from the outboard fitting.

16. The rotor system of claim 14, wherein the outboard bearing assembly further comprises a race that is seated in a bore of the arm.

17. The rotor system of claim 13, wherein the convex and concave mating surfaces are spherical.

18. The rotor system of claim 13, wherein the convex and concave mating surfaces are conical.

19. The rotor system of claim 13, wherein the flange comprises a pair of ears and the blade root is positioned between the pair of ears; and
    the convex and the concave mating surfaces are spherical.

20. The rotor system of claim 13, wherein the flange comprises a pair of ears and the blade root is positioned between the pair of ears; and
    the convex and the concave mating surfaces are conical.

* * * * *